United States Patent
Cadle et al.

[11] Patent Number: 6,148,685
[45] Date of Patent: Nov. 21, 2000

[54] DUPLEX SPROCKET/GEAR CONSTRUCTION AND METHOD OF MAKING SAME

[75] Inventors: Terry M. Cadle, Wauwatosa; Joel H. Mandel, Hartford; Carl J. Landgraf, Waukesha; Timothy E. Geiman, Germantown, all of Wis.

[73] Assignee: Zenith Sintered Products, Inc., Germantown, Wis.

[21] Appl. No.: 09/077,861

[22] PCT Filed: Dec. 5, 1996

[86] PCT No.: PCT/US96/19377

§ 371 Date: Jun. 4, 1998

§ 102(e) Date: Jun. 4, 1998

[87] PCT Pub. No.: WO97/22819

PCT Pub. Date: Jun. 26, 1997

Related U.S. Application Data

[60] Provisional application No. 60/008,696, Dec. 15, 1995.

[51] Int. Cl.$^7$ .................................................. F16H 55/08
[52] U.S. Cl. ............................................. 74/457; 74/434
[58] Field of Search ...................... 74/439, 457, 412 R, 74/434; 419/28, 38, 11, 58; 75/246

[56] References Cited

U.S. PATENT DOCUMENTS

| | | | |
|---|---|---|---|
| 2,859,635 | 11/1958 | Lee | 74/439 |
| 3,320,663 | 5/1967 | Haller | 29/420 |
| 3,324,544 | 6/1967 | Haller | 29/521 |
| 3,665,585 | 5/1972 | Dunn et al. | 29/420 |
| 3,733,921 | 5/1973 | Carveth | 74/439 |
| 3,762,881 | 10/1973 | Dunn | 29/191 |
| 3,768,327 | 10/1973 | Dunn et al. | 74/434 |
| 3,772,935 | 11/1973 | Dunn et al. | 74/434 |
| 3,842,646 | 10/1974 | Kuhn | 72/354 |
| 4,054,449 | 10/1977 | Dunn et al. | 75/208 R |
| 4,111,031 | 9/1978 | Vennemeyer et al. | 72/359 |
| 4,145,798 | 3/1979 | Sarnes | 29/148.4 R |
| 4,172,719 | 10/1979 | McGee et al. | 75/230 |
| 4,277,544 | 7/1981 | Pietrocini | 428/547 |
| 4,595,556 | 6/1986 | Umeha et al. | 419/8 |
| 4,677,870 | 7/1987 | Alshareedah | 74/431 |
| 4,721,598 | 1/1988 | Lee | 419/8 |
| 4,772,340 | 9/1988 | Kawaguchi et al. | 148/152 |
| 4,793,968 | 12/1988 | Mosser et al. | 428/550 |
| 5,049,183 | 9/1991 | Saka et al. | 75/244 |
| 5,096,037 | 3/1992 | Knoess et al. | 192/114 T |
| 5,271,287 | 12/1993 | Wadleigh | 74/439 |
| 5,273,710 | 12/1993 | Zengin | 419/47 |
| 5,356,721 | 10/1994 | Knoess | 428/347 |
| 5,390,414 | 2/1995 | Lisowsky | 29/893.34 |

(List continued on next page.)

FOREIGN PATENT DOCUMENTS

| | | |
|---|---|---|
| 0565161 A1 | 10/1993 | European Pat. Off. . |
| 2043622 | 1/1971 | France . |
| 63043062 | 2/1988 | Japan . |
| 02021054 | 1/1990 | Japan . |
| 07112231 | 5/1995 | Japan . |
| 621475 | 7/1978 | U.S.S.R. . |

OTHER PUBLICATIONS

Applicant's Exhibit A—Supplementary European Search Report for European Application No. 96944235.9, Dated Mar. 15, 2000.

*Primary Examiner*—David M. Fenstermacher
*Attorney, Agent, or Firm*—Quarles & Brady LLP

[57] ABSTRACT

A unitary powder metal gear or sprocket (10) has a teeth region (16) which extends 2–5 mm below the tooth root diameter and a body region (14) radially inside of the teeth region (16). The teeth region (16) is pressed to a higher density than the body region (14) in a two chamber compaction die. The teeth region (16) is made of a sinter or induction hardening material, and the body region (14) is made of a liquid phase sintered material. Materials for the teeth (16) and body (14) regions are selected for compatibility by compacting them into a bimetallic strip (20, 22) with the teeth material (18) on one side and the body material (19) on the other side, sintering the strip (20,22) and observing the amount it bends.

11 Claims, 1 Drawing Sheet

U.S. PATENT DOCUMENTS

| | | | |
|---|---|---|---|
| 5,455,000 | 10/1995 | Seyferth et al. | 419/36 |
| 5,540,883 | 7/1996 | Jones et al. | 419/28 |
| 5,598,631 | 2/1997 | Umezawa et al. | 29/888.011 |
| 5,659,873 | 8/1997 | Seyrkammer | 419/29 |
| 5,659,955 | 8/1997 | Plamper | 29/893.32 |
| 5,666,632 | 9/1997 | Maulik | 419/6 |
| 5,724,860 | 3/1998 | Sekiguchi et al. | 74/567 |
| 5,729,822 | 3/1998 | Shivanath et al. | 428/551 |
| 5,738,052 | 4/1998 | Meurer et al. | 123/90.6 |
| 5,881,354 | 3/1999 | Shivanath et al. | 419/11 |
| 5,901,336 | 5/1999 | Dombrowski | 419/6 |
| 5,902,943 | 5/1999 | Schaffer et al. | 75/249 | he# DUPLEX SPROCKET/GEAR CONSTRUCTION AND METHOD OF MAKING SAME

This application claims the benefit of U.S. Provisional Patent Application No. 60/008,696 filed Dec. 15, 1995.

BACKGROUND OF THE INVENTION

1. Field of the Invention

This invention relates to sprockets and gears, and in particular to a construction for sprockets and gears which is made using dissimilar compatible powder metals.

2. Discussion of the Prior Art

Internal combustion engines must ensure that the piston motion which compresses the air/fuel mixture is coordinated with the intake and exhaust valves opening and closing by means of a timing system. The most common timing system utilizes two sprockets with teeth encompassed by a metal link chain. The crankshaft sprocket drives the chain which in turn applies torque to the camshaft sprocket, thereby turning it in unison. Typically, the camshaft sprocket is significantly larger than the crankshaft sprocket, to effect a speed reduction.

Camshaft sprockets are usually made from a metal stamping or machined casting of aluminum alloy or cast iron. Modern high output engines demand greater precision and improved endurance including tooth strength and wear resistance. An additional requirement is quietness, referred to as NVH quality (noise vibration and harshness).

In recent years, a new technique of manufacture is powder metallurgy (P/M). This involves the use of iron and other powders which are blended and then compacted into a preform shaped like the cam sprocket. A thermal treatment called sintering causes the compacted particles to bond together metallurgically forming a structural component. The P/M process has the benefit of large volume precision component manufacture.

In the case of high functional demands, for example a sprocket or gear, a P/M part has to be made to a high density. This generally requires a process sequence involving powder compaction, sintering, repressing and finally induction hardening. The high alloy and high density result in high cost in production and high weight, particularly in a large sprocket or gear. In addition, high density imparts a high modulus of elasticity to the P/M alloy which transmits noise (i.e. "rings" when subjected to mechanical vibration).

SUMMARY OF THE INVENTION

The invention provides an improved powder metal sprocket or gear of unitary construction having engagement teeth in a teeth region around the periphery of a body region in which the teeth region is of a different powder metal material than the body region. The two different powder alloys have properties tailored to the local functional requirements.

In a useful form, the teeth are made from an alloy steel which is hardenable. Preferably, this alloy hardens directly on cooling from the sintering furnace to eliminate any subsequent hardening steps. Alternatively, this alloy can be an induction hardening alloy.

Preferably, the teeth region extends to just below the teeth roots and is compacted to high density to ensure high tooth strength and wear resistance. The majority of the part inside of the teeth, which is the body, is made from a powder blend which can be compacted at low pressure to low density, yet exhibits high compacted strength to enable handling without cracking prior to sintering. The higher density of the teeth region provides high tooth strength and wear resistance, and the lower density of the body region reduces weight and deadens sound transmission.

In order to achieve adequate functional strength in the body of the finished product at a relatively low density, a metallurgical process known as liquid phase sintering is used. This produces a small amount of evenly distributed molten metal during sintering. This activates diffusion of the metal powder surfaces resulting in a stronger material and rounded micro-porosity which provides toughness. The low density of the body provides a low elastic modulus that tends to deaden sound. The low weight is an advantage in service since it requires less energy to accelerate and decelerate the sprocket. Weight savings of over 25% are possible with this approach.

In addition, the lower alloy level and lower weight of the body, plus avoidance of induction hardening, result in substantial cost reduction in manufacturing. Since a lower compacting pressure is required for the low density core (30% of the conventional pressure) a smaller, faster and less expensive press can be used to further reduce the cost.

In a preferred method of making a gear or sprocket of the invention, the powder metal material of the teeth region is charged into a teeth region of a two chamber compaction die and the powder metal material of the body region is charged into a body region of the die. The powders in the die are then pressed with a higher pressure in the teeth region than in the body region. The sprocket or gear in then ejected and sintered. In connection with this method, materials for the teeth and body regions are selected for compatibility by compacting them into a bimetallic strip, sintering the strip and observing the amount it bends.

Other objects and advantages of the invention will be apparent from the detailed description and drawings.

DETAILED DESCRIPTION OF THE PREFERRED EMBODIMENTS

Figure 1:
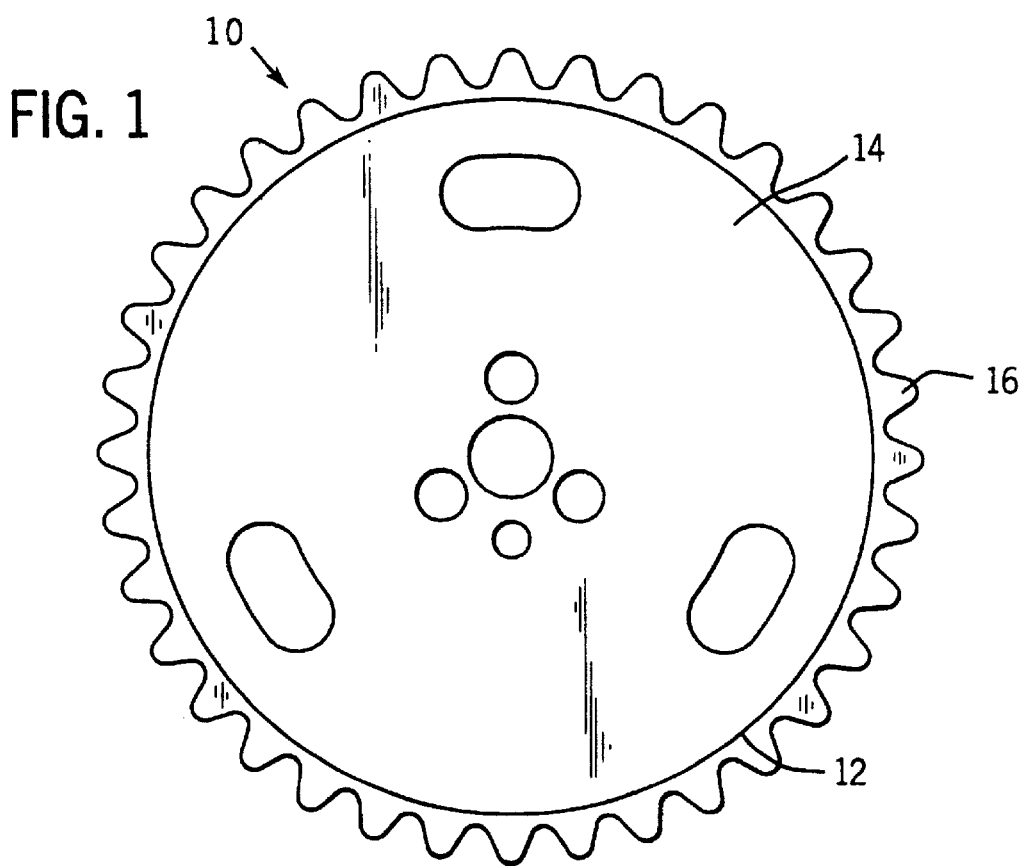
FIG. 1 is a front plan view of a sprocket made according to the invention.

FIG. 1 illustrates a sprocket 10 made in accordance with the invention. The sprocket 10 is made in one piece, i.e., it is unitary, and includes a body 14 supporting peripheral teeth 16. Different zones or regions are defined within the sprocket 10 by the two different materials which are used to make the body 14 and teeth 16. The approximate dividing line between the two materials is identified by the line 12, with the relatively soft, porous material of the body zone 14 radially inside of the line 12 and the relatively hard, dense material of the teeth zone 16 radially outside of the line 12.

The outer teeth zone 16 preferably extends inside of the tooth root diameter by approximately 2 mm to 5 mm. It should be understood that the line 12 may not necessarily be a perfectly sharp line, as some fusing and diffusion of the two materials across this line takes place in production.

The teeth 16 and body 14 alloys must be compatible materials so that they will be dimensionally stable during the sintering process. During sintering of the compact, each alloy powder either shrinks or grows. It is important to match the dimensional change of the two alloys to minimize distortion and residual stresses on cooling. To achieve this neutral situation, a series of experiments was carried out with many variations of each of the two alloys being evaluated.

Figure 2:
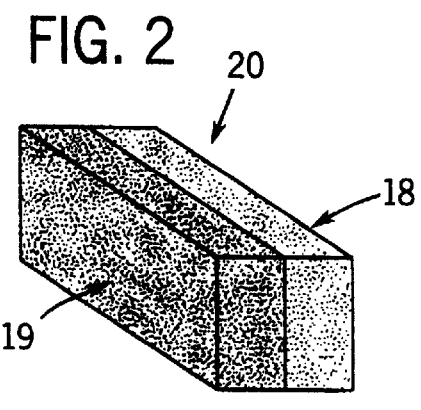
FIG. 2 is a perspective view of a bi-metallic test sample made of two materials which are dimensionally compatible.
Figure 3:
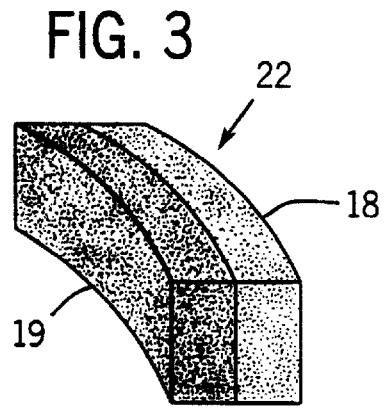
FIG. 3 is a perspective view of a bi-metallic test sample made of two materials which are dimensionally incompatible.

A novel approach was used to evaluate dimensional compatibility of the two alloys. A thin two layer rectangular compact was made and then sintered standing on edge as shown in FIGS. 2 and 3. The proposed teeth material is used on one side 18 and the proposed body material is used on the other side 19 of the bar. The result is a bi-metallic strip that will bend in one direction or the other, or stay straight, depending on the relative expansion/contraction differential. Successful combinations resulted in a straight bar 20 as shown in FIG. 2, indicating compatibility, whereas unsuccessful combinations resulted in bars that curved excessively one way or the other, like the bar 22 shown in FIG. 3.

To manufacture a sprocket 10, the two separate powder blends are charged into a two chamber compaction die, which does not form part of this invention. Two chamber compaction dies are known, for example, for making bearings formed of two different materials. A thin retractable divider sleeve separates the two chambers (the inside chamber for the body 14 and the outside chamber for the teeth 16) along the junction identified by the line 12. The requisite amount of the powder metal alloy for the teeth 16 is placed in the outside chamber and the requisite amount of the powder metal alloy for the body 14 is placed in the inside chamber, preferably by known automatic equipment. The divider sleeve is then retracted to allow the two alloys to interface with one another at the junction 12, and separate punches are used to compact the teeth 16 and body 14 of the sprocket 10 so that different densities can be achieved as indicated earlier.

Preferably, the body material is a 2% copper medium carbon steel with an additive to enhance low density and green strength. The teeth are made from a modified ASTM 4600 composition which hardens during the sintering operation. Such an alloy is herein referred to as a sinter-hardening alloy, which is an alloy that forms a martensite structure when cooling from a sintering furnace.

An example of the invention is as follows:

Two powder blends are prepared, one for the sprocket teeth 16 and one for the body 14 of the sprocket. The teeth blend consists of: 96.3% of an iron, nickel, molybdenum pre-alloy powder containing 2% nickel and 0.5% molybdenum (balance iron); 1% of elemental copper; 1% of elemental nickel; 1% of fine graphite; and 0.7% of a pressing lubricant such as zinc stearate.

The body blend consists of 76.7% base iron made by atomization; 20% high compaction strength iron powder; 2% copper; 0.3% graphite; and 1% butyl stearamide pressing lubricant.

The two powders are contained in a feeding device that places the high alloy powder into the outer cam sprocket teeth area and the low cost, low alloy powder into the sprocket body area of the compaction tooling. Separate lower punches are provided for the teeth area and the body area, respectively, to enable each to be compacted to the required density. The powders are then compacted in a suitable press and the powder compact is ejected from the tooling. The teeth are typically compacted at about 3 times the pressure of the body, e.g., 45 tons/in$^2$ for the teeth 16 and 15 tons/in$^2$ for the body 14.

The compact is then passed through a continuous sintering furnace set at 2070° F. for 15 minutes. The furnace is fitted with an accelerated cooling device. On cooling, the sprocket teeth are hardened but the body remains soft due to the different alloy compositions. The sintered body may then be machined to final tolerances and subjected to deburring to smooth off the sharp edges. The parts are dipped in rust protective fluid and packed for shipment.

Although a sprocket is described in detail for practicing the invention, it should be understood that the invention could be applied to a gear as well. In addition, it should be understood that an induction-hardening material could be used for the teeth, rather than a sinter-hardening material.

Thus, a sprocket or gear made of two separate materials manufactured by powder metallurgy, one material for the teeth and one for the body has been described. The outer teeth region is preferably made from a sinter-hardening alloy, which avoids an additional heat treatment step. The material of the teeth is compacted at high density for strength and wear resistance. The body is made from a low alloy, low density material to save weight, absorb noise and minimize cost. The result is a sprocket or gear that has improved performance, reduced weight and lower cost.

We claim:

1. In a sintered powder metal toothed wheel of unitary construction having engagement teeth in a teeth region around the periphery of a body region, said teeth and body regions being integral with one another, the improvement wherein said teeth region is made of a powder metal material of a composition which is different from the composition of the powder metal material of said body region, and wherein said teeth region is of a higher density than said body region.

2. The improvement of claim 1, wherein said teeth region is made of a powder metal material which hardens during a sintering operation.

3. The improvement of claim 1, wherein said teeth region is made of a powder metal material which hardens during an induction heating operation.

4. The improvement of claim 1, wherein said teeth region at all points along an inner periphery of said teeth region extends below a tooth root diameter of said toothed wheel.

5. The improvement of claim 4, wherein said teeth region extends below said tooth root diameter by 2–5 millimeters.

6. The improvement of claim 1, wherein said body region is made from a powder metal material which is a medium carbon steel with a 2% copper content.

7. The improvement of claim 6, wherein said teeth region is made from a powder metal material which hardens during a sintering operation.

8. The improvement of claim 1, wherein said body region is defined by said toothed wheel inside of a cylindrical space and said teeth region is defined by said toothed wheel outside of said cylindrical space.

9. A method of making a powder metal toothed wheel of unitary construction having engagement teeth in a teeth region around the periphery of a body region, said teeth and body regions being integral with one another, comprising the steps of:

charging a teeth region chamber of a two chamber compaction die with a powder metal material of said teeth region of said toothed wheel;

charging a body region chamber of said compaction die with a powder metal material of said body region of said toothed wheel, said powder metal material of said teeth region being of a composition which is different from the composition of the powder metal material of said body region;

simultaneously pressing said powder metal materials in both of said chambers of said compaction die with a higher pressure in said teeth region chamber than in said body region chamber;

ejecting said toothed wheel from said compaction die; and sintering said toothed wheel.

10. A method as claimed in claim 9, wherein said powder metal materials of said teeth and body regions are composed so as to minimize bend in a sintered powder metal bimetallic strip with one of said materials on one side and the other of said materials on the other side when said bimettalic strip is sintered.

11. A method of making a powder metal toothed wheel of unitary construction having engagement teeth in a teeth region around the periphery of a body region, said teeth and body regions being integral with one another, comprising the steps of:

charging a compaction die with at least two powder metal materials of said toothed wheel, said materials being of different composition and at least one of said materials being for said teeth region and at least one other of said materials being for said body region;

compacting, in said compaction die, said at least one powder metal material of said teeth region to a higher density than said at least one powder metal material of said body region; and after said compacting step, sintering said toothed wheel.

\* \* \* \* \*